(12) United States Patent
Anderson et al.

(10) Patent No.: US 12,499,849 B2
(45) Date of Patent: Dec. 16, 2025

(54) TRANSMITTER WITH E-PAPER DISPLAY THAT DETECTS POWER SUPPLY

(71) Applicant: Sound Devices LLC, Reedsburg, WI (US)

(72) Inventors: Matthew G. Anderson, Madison, WI (US); Jason McDonald, Madison, WI (US)

(73) Assignee: Sound Devices LLC, Reedsburg, WI (US)

(*) Notice: Subject to any disclaimer, the term of this patent is extended or adjusted under 35 U.S.C. 154(b) by 0 days.

(21) Appl. No.: 18/631,593

(22) Filed: Apr. 10, 2024

(65) Prior Publication Data
US 2024/0339088 A1 Oct. 10, 2024

Related U.S. Application Data

(60) Provisional application No. 63/495,149, filed on Apr. 10, 2023.

(51) Int. Cl.
*G09G 3/34* (2006.01)
*G06F 3/16* (2006.01)
*H04B 1/02* (2006.01)

(52) U.S. Cl.
CPC .......... *G09G 3/3453* (2013.01); *G06F 3/162* (2013.01); *G09G 3/3406* (2013.01); *G09G 2330/02* (2013.01); *G09G 2354/00* (2013.01); *H04B 1/02* (2013.01)

(58) Field of Classification Search
CPC .............. G09G 3/3453; G09G 3/3406; G09G 2330/02; G09G 2354/00; G06F 3/162; H04B 1/02
See application file for complete search history.

(56) References Cited

U.S. PATENT DOCUMENTS

| | | | |
|---|---|---|---|
| 12,045,404 B1* | 7/2024 | Nordby | G06F 3/03545 |
| 2013/0217332 A1* | 8/2013 | Altman | G06Q 20/3224 |
| | | | 455/3.01 |
| 2015/0339736 A1* | 11/2015 | Bennett | G06Q 30/0278 |
| | | | 705/306 |
| 2016/0226260 A1* | 8/2016 | Wu | H02J 7/0063 |
| 2022/0284873 A1* | 9/2022 | Prendergast | G10H 1/0008 |

OTHER PUBLICATIONS

"A10-TX-US Digital Transmitter User Guide", Sound Devices, Reedsburg, WI 53959 (Admitted Prior Art).

* cited by examiner

*Primary Examiner* — Towfiq Elahi
(74) *Attorney, Agent, or Firm* — Andrus Intellectual Property Law, LLP

(57) ABSTRACT

Methods and devices are provided for the construction of an electronic device, such as a digital wireless transmitter, containing an e-paper display that is sensitive to changes in the configuration of the power supply for the device. This display provides up-to-date accurate information to a user, even after a power disconnect.

13 Claims, 4 Drawing Sheets

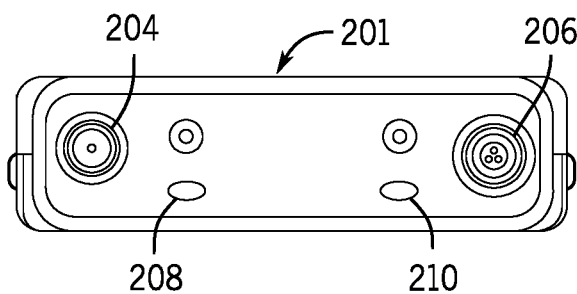
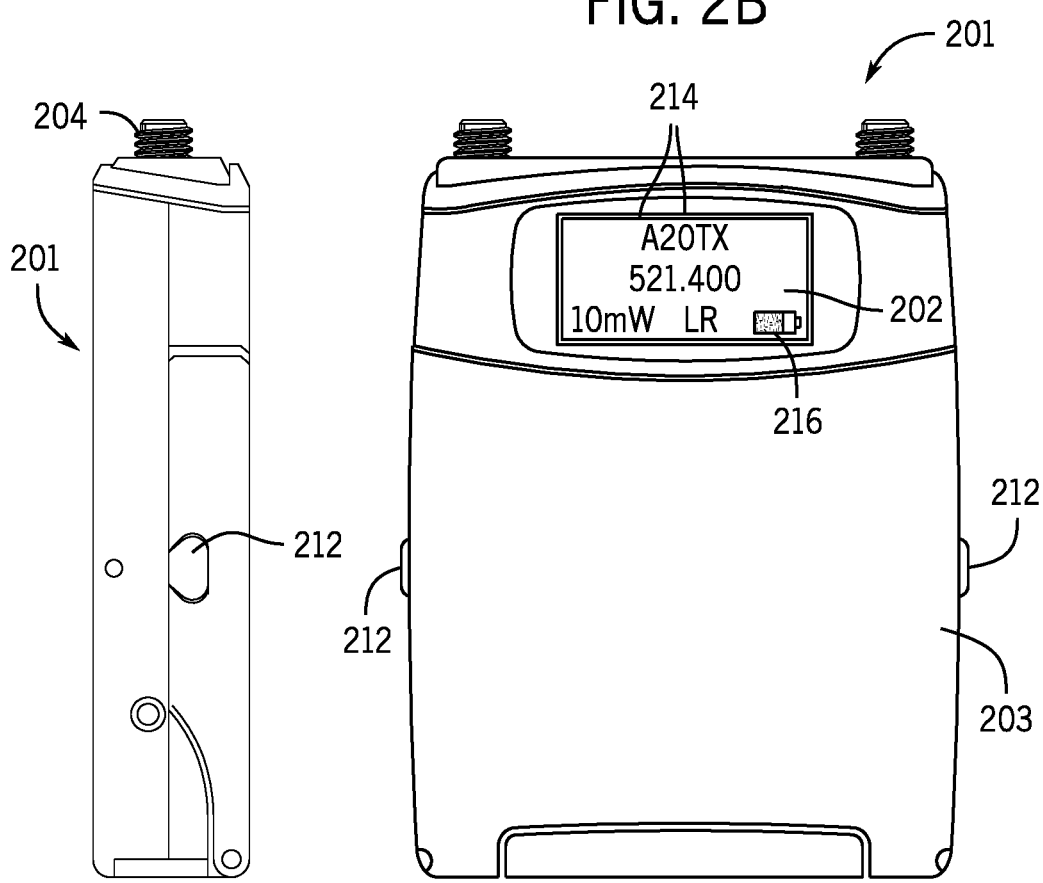
FIG. 2B
FIG. 2C FIG. 2A

TRANSMITTER WITH E-PAPER DISPLAY THAT DETECTS POWER SUPPLY

CROSS-REFERENCE TO RELATED APPLICATION

The present application claims priority of U.S. Provisional Patent Application No. 63/495,149, filed Apr. 10, 2023, the content of which is incorporated herein by reference in its entirety.

FIELD OF THE INVENTION

The invention relates generally to the use of an e-paper display on a digital wireless transmitter typically worn by a performer or attached to a boom for broadcasting or recording an audio performance. In a more specific aspect, the disclosed invention provides means to improve the accuracy of information content on an e-paper display mounted as part of an electronic device when the power supply is interrupted.

BACKGROUND

In recent years, the use of electronic paper (or "e-paper") displays has grown in popularity for a number of reasons. In summary, e-paper displays operate by modifying the reflection of ambient light (like paper), rather than generating their own light (like in the case of LED displays). As a result, they are able to provide users with a display that remains comfortably readable without the appearance of fading even under direct sunlight. An e-paper display provides a good contrast ratio and wide viewing angle (like paper). Additional advantages include efficient power consumption along with the ability to continue the static display of information content even after a complete disconnection from power supplies.

Digital wireless transmitters are typically battery powered and worn by performers or attached to a boom when broadcasting or recording an audio performance. A digital transmitter receives an analog signal from an attached microphone or guitar pickup and transmits a digital signal to a receiver via an RF antenna. Some transmitters have a user interface with a small display, usually an LED display.

SUMMARY

The invention pertains to audio or visual equipment, such as a digital wireless transmitter, comprising an e-paper information display, a processor, a power supply mode supporting these along with other electronics designed to perform a desired task, computation or operation. The use of an e-paper display on an audio digital transmitter, e.g. an audio body pack digital transmitter, is particularly desirably since as mentioned above audio digital transmitters are often used and programmed in sunlit environments where information on conventional backlit LED screens is difficult to view. Information on backlighted displays is easier to view in dark environments. To address this issue, supplemental LED lights are provided adjacent to the e-paper display and can be activated to shine on the e-paper display.

Despite the many advantages of e-paper displays, there are still some shortcomings that may arise when static information is continually displayed while users make changes to the configuration of a device. These changes may include the addition and/or removal (or attachment and/or disconnection) of modules, such as submodules designed to enhance the processing capability of devices or facilitate the connectivity of a device to other electronics. These changes may also include those made to the mechanical mounting of a device and in some cases, the user may reconfigure, disconnect, or replace power supplies such as batteries, battery packs, or transformers supplying nominal AC and/or DC voltage supplies to power equipment.

In many cases, an e-paper display may be utilized to provide current (or real-time) status to users, such as the operating mode and/or connective status of the device, including the status of power supplies. Ideally, this information may include battery life monitoring and the detected input voltage being provided by any connected supplies. In some cases, users may need to rely on e-paper displays for information relating to the operation (voltage, current draw and connection status) of connected supplies.

In these cases, an interruption in power either due to the removal of batteries, or an accidental unplugging (pulled plug) may lead to misinformation being left on the e-paper display after the interruption in power has occurred.

To address this issue in accordance with the invention, it is preferred that the electrical hardware be configured such that the processor will receive notice or have the ability to detect that a power interruption has occurred or that one is imminent. Upon receiving notice, the processor refreshes the e-paper display such that the power status icon on the delay is removed or modified to indicate that the power status may not be accurate. In this way, if or when a power interruption occurs, the power status icon on the static e-paper display will not show incorrect information regarding power or battery status, while the power is disconnected or interrupted.

Two exemplary embodiments of the invention are shown in the drawings. A first embodiment is applicable for an audio or visual recording device utilizing a DC power supply, where some flexibility (size and cost) exists with regard to the internal design of their power supplies. The device in the first embodiment includes a reserve capacitor that is charged by the DC power supply under normal operating conditions. The device also includes a power level or voltage sensor that provides a signal to the microprocessor. If the sensed power or voltage level is below a threshold indicating that power from the DC power source has been interrupted, the microprocessor instructs the e-paper display to refresh using the power from the reserve capacitor (if needed) to either remove or modify the power status icon so that the static e-paper display will not show incorrect information regarding power or battery status, when the power is disconnected or interrupted. This embodiment does not require the use of Hall sensors.

The second exemplary embodiment is directed to a battery-powered audio or visual device, such as an audio digital transmitter, which has a battery door or cover that can opened or removed to provide access to batteries or a removable battery pack. In this embodiment, a Hall sensor preferably serves to detect a condition of the device, such the battery door opening, although other types of sensors can be used to sense whether the door is open (e.g. a spring-loaded mechanical switch, or even a light sensor). If the sensor indicates that the door has been opened or the cover removed, the microprocessor instructs the e-paper display to refresh to either remove or modify the power status icon so that the static e-paper display will not show incorrect information regarding battery status, in the event that the battery power is disconnected and the door or cover is replaced without replacing a fresh or recharged battery.

Accordingly, within the context of the invention, either a change to the power configuration or an impending change is detected such that an e-paper display embedded on the device may be updated to continue providing accurate power status information, even after the power is disconnected.

BRIEF DESCRIPTION OF THE DRAWINGS

FIGS. 2A-2C is illustrate a digital wireless RF transmitter implementing a second exemplary embodiment of the invention.

DESCRIPTION OF EMBODIMENTS OF THE INVENTION—E-PAPER DISPLAY

Figure 1:
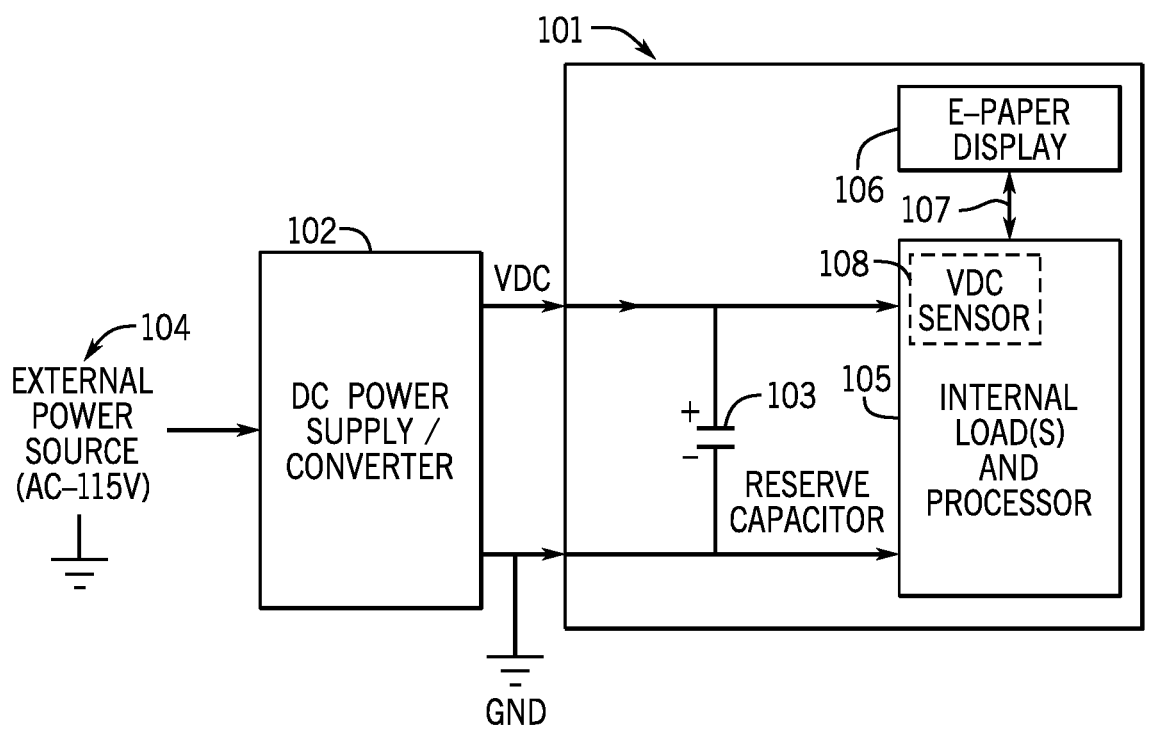
FIG. 1 is a simplified diagram of an audio or visual recording device with an e-paper display configured in accordance with a first exemplary embodiment of the invention, where a reserve capacitor and a power level or voltage sensor are provided to facilitate refreshing the e-paper display remove or modify information on the display when power is disconnected or interrupted.

FIG. 1 shows a generic representation for an audio or visual device 101, such as an wireless audio RF transmitter or other audio recording and mixing equipment that may use an e-paper display 106 like a portable RF receiver device, constructed in accordance with a first embodiment of the present application. As shown in FIG. 1, the electrical device 101 receives a DC power input, $V_{dc}$ from a power supply (or regulator) 102 that may be fed by another power source 104, such as by plugging the DC power supply 102 into standard 115V AC wall plug outlet 104. The DC power supply 102 may be contained in the same housing as the other components of the electrical device 101. In this embodiment, the electrical device 101 includes a shunt capacitor 103 straddling the DC supply lines. During normal operation, the capacitor 103 remains charged with a voltage equal to the value output from the DC supply 102, $V_{dc}$, while the processor and other internal electronics 105 in the device 101 are powered for normal operation from the DC power supply 102. Normal operation includes providing periodic updates across an internal serial interface 107 to the e-paper display 106, to allow the e-paper display 106 to refresh if necessary to display up-to-date information relating to power supply status (voltage level) or any other information that is regularly displayed in accordance with settings that have been selected by a user.

Still referring to the audio or visual recording or mixing device 101 of FIG. 1, in the event of a power disconnect or power failure (for example, by an accidental pulling of a plug/wire, supply failure or power utility failure), the internal electronics 105, including the processor, will ultimately (with loss of power) cease operation. Since the e-paper display 106 continues a static display of information without power, it continues to display the information that it last received from the processor 105 over the serial connection 107 (while the power supply 102 was still operative). In this case (without the benefit of the disclosed invention), any information pertaining to power supply status (that was last transmitted while the power supply was active) would become inaccurate, potentially misleading the user.

However, in this embodiment of the present invention, the shunt capacitor 103 continues to provide an input voltage to the terminals for the processor and other internal electronics 105 for a short period of time, depending on the value of capacitance selected for capacitor 103. As part of this first embodiment of the invention, the processor 105 or a dedicated power level or voltage senor 108 monitors the value for the DC input voltage, $V_{dc}$ and updates the display. However, provided that immediately after a power loss from the DC power supply 102, the processor continues to function (perhaps only for a few ms) based on the power supplied by the shunt capacitor 103, during which time the sensor 108 senses that the voltage level is falling. Once the threshold for a lower bound on allowable voltage is crossed, the processor provides a final update/refresh to the e-paper display 106 to indicate a power fault to the user, or alternatively remove the power status icon from the display. After this, as the shunt capacitor 103 is completely discharged by supplying its reserve power to the internal electronics 105, the processor would cease to operation. Since the e-paper display 106 has been left with up-to-date information pertaining to the power loss, it displays accurate information to the user-alerting them in regard to the corruption of input power.

The first embodiment of the invention requires the use of a shunt capacitor having a sufficient energy storage capacity (capacitance) to keep the processor in a functional state for a long enough period of time to detect a change in power status and update the e-paper display information before going offline. Capacitors require a significant volume of space and add a non-trivial mass to a device. It may therefore be desirable to refresh the e-paper display without the use of the shunt capacitor 103.

FIGS. 2A-2C and 3 illustrate an exemplary digital wireless RF transmitter 201 having a configuration sensitive e-paper display 202 in accordance with a second exemplary and preferred embodiment of the present invention. The assignee of the this application, Sound Devices, LLC manufacturers digital wireless RF transmitters, and the illustrated transmitter 201 is sold under the product name A20-TX, which is a next generation design of the A10-TX. The digital wireless RF transmitter 201 collects signals from a microphone or a guitar pick up and wirelessly transmits them to a wireless RF receiver. Since the digital wireless RF transmitter 201 is typically intended to be worn by the user (e.g. body pack), the transmitter 201 uses batteries, removing the requirement for any power cords. The RF transmitter 201 can use single use batteries or rechargeable batteries. Due to power requirements for its RF transmitter 201, batteries need to occasionally be replaced (refreshed) by users. Since this occurs on a recurring basis, most power interruptions will ultimately occur whenever a user opts to replace batteries. As can be seen in FIG. 2, the RF transmitter 201 includes an e-paper display 202 mounted in the upper part of the unit. The RF transmitter 201 also includes a battery bay door 203 (shown as closed in this view) attached to the front of the unit. The top surface of the RF transmitter 201 includes an antenna connector 204, and a multipurpose audio input port 206, which is capable of connecting to various microphones and guitar pick up devices. The RF transmitter 201 also desirably includes a power status LED 208 and an operational mode status LED 210 (mute, record, pairing, transmitting, time code syncing). Pressure releasable latches 212 are provided to latch the battery bay door 203 in the closed position. LED lights 214 are mounted adjacent to the e-paper display 202 and can be activated to shine on the e-paper display 202 to facilitate viewing in dark environments. With the battery bay door 203 closed, a home screen is displayed on the e-paper display 202. The home screen includes information deemed pertinent when operating the RF transmitter 201, including a power or battery status icon 216.

Figure 3:
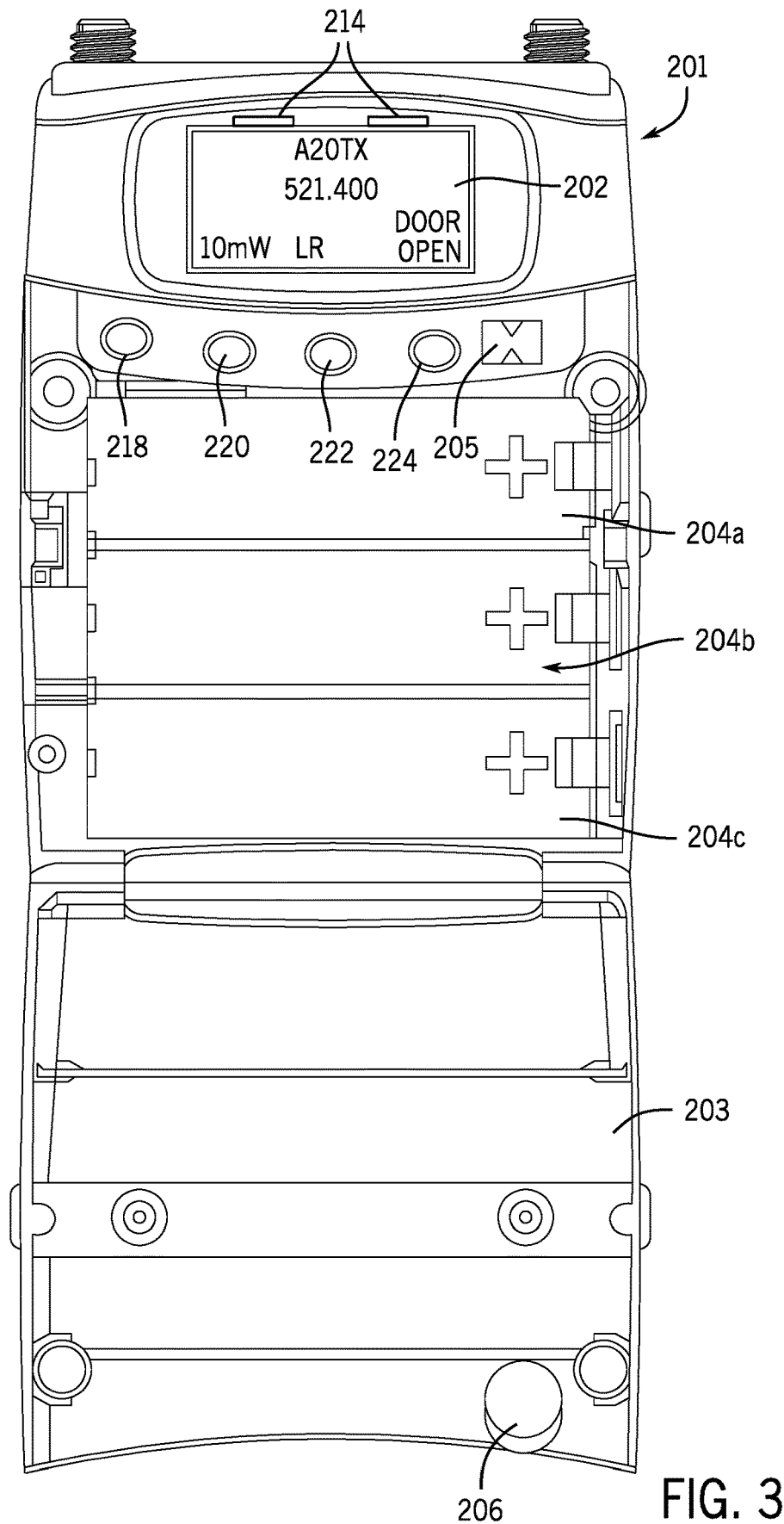
FIG. 3 is a front assembly view of the digital wireless transmitter shown in FIGS. 2A-2C, showing a battery bay inside the opened battery door and a Hall sensor location according the second exemplary embodiment of the invention.

FIG. 3 shows the RF transmitter 201 from the front of the unit 201 with the battery bay door 203 has been flipped down into the open position, which allows access to the battery bay for removal and/or replacement of the batteries. With the door 203 open, buttons 218, 220 222 and 224 are exposed for the user to navigate and program the RF transmitter 201. Button 218 is a power on/off button. Buttons 220, 222, 224 are for navigating menus and setting and selecting values on the programmable interface. In this example, the battery bay accepts 3 batteries with one battery assigned to each docking slot 204 a-c. In other embodiments, the number of batteries may vary, or a rechargeable battery pack can be used. A Hall sensor 205 is mounted to the chassis of the RF transmitter 201 facing the inside of the battery bay door 203, and, a magnet 206 (to activate the Hall sensor 205, as the door 203 is opened or closed) is mounted on the inside of the battery bay door (lid) 203 such that closing the door 203 brings the magnet 206 into close proximity with the Hall sensor 205. By connecting the microprocessor in the RF transmitter 201 to the Hall sensor 205, the microprocessor can monitor the status of the battery bay door 203. If at any time a user opens the door 203, the software in the microprocessor assumes that a change in battery status is potentially imminent and updates the e-paper display 202 before any battery disconnection occurs, see "DOOR OPEN" message on e-paper display 202 in FIG. 3. On the other hand, as long as the Hall sensor 205 status indicates that the battery bay door 203 is closed, and batteries are loaded and providing power, the processor will direct the e-paper display 202 to include normal battery status information, see FIG. 2A. The signal from the Hall sensor 205 can be used for other purposes as well, such as automatically turning on the supplemental LED lights 214 when the door is opened.

Figure 4:
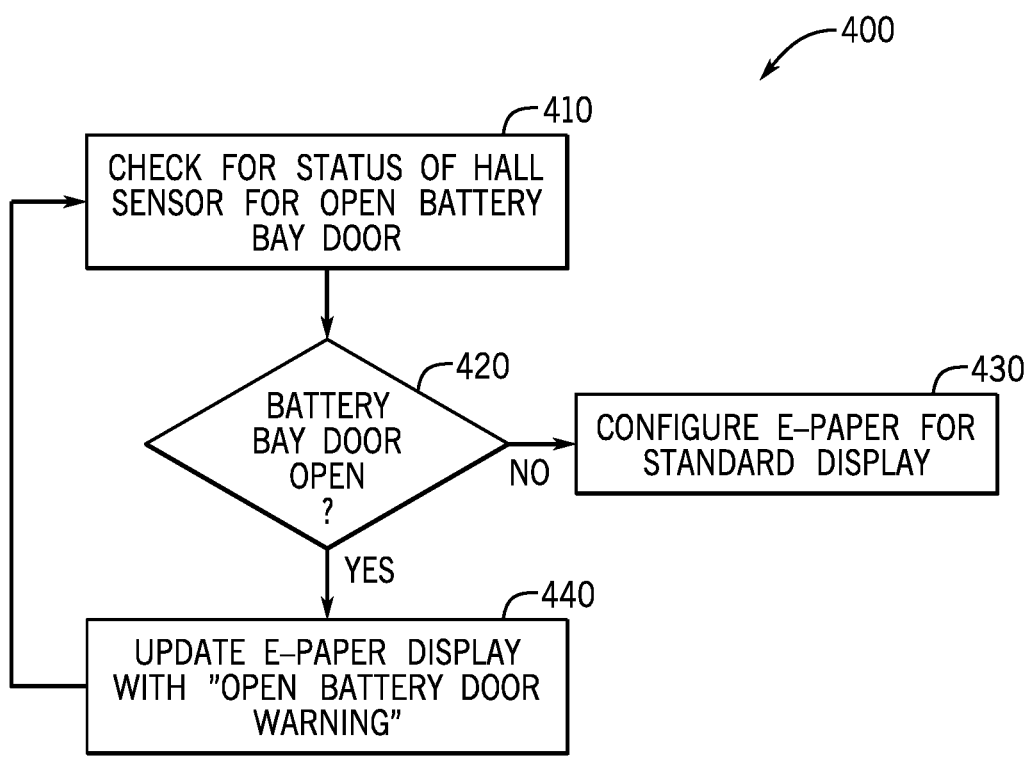
FIG. 4 is a flow-chart illustrating the steps that software in a processor in the digital wireless transmitter may take after power-up to determine whether a change in the power connectivity status has taken place.

Turning now to FIG. 4, a flow-diagram 400 illustrates steps that a software algorithm running on the microprocessor may take in managing the e-paper display 202 in FIGS. 2 and 3. First, at step 410, the microprocessor reads the status of the Hall sensor 205. If it indicates the battery bay door 203 is closed, the software algorithm proceeds to step 430 where normal operation continues with the microprocessor configuring the e-paper display 202 to output standard information for normal use. This standard may include battery life status, if so configured. On the other hand, if at step 410, the Hall sensor status indicates an opened battery bay door 203, the microprocessor proceeds to step 440 where it instructs the e-paper display 202 to indicate (or warn) that the door 203 is open. This step may also include removing any status information about the batteries, since it is reasonable to assume the batteries may soon be undergoing replacement. Any cumulative information regarding battery life is also preferably reset. From either step 430 or 440, the microprocessor 105 software proceeds back to step 410 and continues as long as charged batteries are installed.

Note that the present invention is by no means limited to these embodiments, as described herein. Numerous additional modes and details for embodiments providing similar function will be apparent to those skilled in the art, none of which should be construed as departing from the spirit and scope of the present invention. For example, alternative means to detect an open battery bay door may include the use of reflecting LEDs and sensors or even a mechanical switch connected to the hinges of the door to provide status to the microprocessor or electrical contacts placed on the chassis and door. Furthermore, other means of providing a shunt capacitor are envisioned—for example where it may be attached externally to the unit or even mounted along a corded power supply.

The invention claimed is:

1. A digital wireless RF transmitter for broadcasting or recording audio performances, said transmitter comprising:
   an audio input port configured to receive an analog audio signal from an attached microphone or guitar pick up;
   a microprocessor;
   an RF transmitting antenna configured to transmit a digital audio signal;
   a user interface comprising an e-paper display; and
   a battery bay with a battery bay door, and a door sensor that senses whether the door is open, wherein the microprocessor receives a signal from the door sensor is programmed to operate the e-paper display in accordance with the following steps:
   a. providing a home screen that is displayed on the e-paper display when the battery bay door is closed, said home screen including a battery status icon that provides an active state in which current information regarding battery status is displayed when the e-paper display is refreshed;
   b. repeatedly checking the status of the signal from the door sensor;
   c. refreshing or maintaining the home screen on the e-paper display with the battery status icon in its active state if the signal from the door sensor indicates that the door is closed;
   d. refreshing the home screen on the e-paper display to remove the battery status icon or indicate that the battery icon is not active and may not be displaying current information regarding battery status if the signal from the door sensor indicates that the door is open;
   such that the home screen does not display the battery status icon in an active state when batteries are removed and the battery door is shut.

2. The digital wireless RF transmitter recited in claim 1 wherein the door sensor is a Hall sensor.

3. The digital wireless RF transmitter recited in claim 1 further comprising LED lights that provide supplemental lighting for the e-paper display, wherein said LED lights are activated if the signal from the door sensor indicates that the door is open.

4. The digital wireless RF transmitter recited in claim 1 wherein the user interface further comprises menu navigation buttons and an on/off button, and the menu navigation buttons and an on/off button are concealed when the battery bay door is closed and are exposed for the user to navigate and program the digital wireless RF transmitter when the battery bay door is open.

5. The digital wireless RF transmitter recited in claim 4 wherein supplemental LED light is activated if the signal from the door sensor indicates that the battery bay door is open.

6. A digital wireless RF transmitter for broadcasting or recording audio performances, said transmitter comprising:
   an audio input port configured to receive an analog audio signal from an attached microphone or guitar pick up;
   a microprocessor;
   an RF transmitting antenna configured to transmit a digital audio signal; and a user interface comprising an e-paper display;
wherein the transmitter receives DC power from a power supply, has a reserve capacitor in parallel with the microprocessor to store a limited amount of electrical power for the microprocessor when the DC power supply is disconnected or interrupted; and has a power level sensor to sense the voltage level of the electrical power being supplied to the transmitter;
wherein the power level sensor sends a signal to the microprocessor, and the microprocessor is programmed to operate the e-paper display in accordance with the following steps:
   a. providing a home screen that is displayed on the e-paper display, said home screen including a power status icon that provides an active state in which current information regarding power status is displayed when the e-paper display is refreshed;
   b. repeatedly checking the status of the signal from the power level sensor;
   c. refreshing or maintaining the home screen on the e-paper display with the power status icon in its active state if the signal from the power level sensor indicates that the power level is at or above a set operating threshold value;
   d. refreshing the home screen on the e-paper display, using power stored in the reserve capacitor, to remove the power status icon or indicate that the power status icon is not active and may not be displaying current information regarding power status if the signal from the power level sensor indicates that the power level is below the set operating threshold value;
   such that the home screen does not display the power status icon in an active state when the power level is below the set operating threshold value.

7. An audio or visual recording or mixing device comprising:
   a microprocessor;
   a user interface comprising an e-paper display;
   a battery source of power;
   a battery bay door;
   a door sensor that senses whether the door is open;
   wherein the microprocessor receives a signal from the door sensor and the microprocessor is programmed to operate the e-paper display in accordance with the following steps:
   a. providing a home screen that is displayed on the e-paper display when the battery bay door is closed, said home screen including a battery status icon that provides an active state in which current information regarding battery status is displayed when the e-paper display is refreshed;
   b. repeatedly checking the status of the signal from the door sensor;
   c. refreshing or maintaining the home screen on the e-paper display with the battery status icon in its active state if the signal from the door sensor indicates that the door is closed;
   c. refreshing the home screen on the e-paper display to remove the battery status icon or indicate that the battery icon is not active and may not be displaying current information regarding battery status if the signal from the door sensor indicates that the door is open;
   such that the home screen does not display the battery status icon in an active state when batteries are removed and the battery door is shut.

8. An audio or visual recording or mixing device recited in claim 7 wherein the door sensor is a Hall sensor.

9. The audio or visual recording or mixing device recited in claim 7 further comprising LED lights that provide supplemental lighting for the e-paper display.

10. The audio or visual recording or mixing device recited in claim 9 wherein said LED lights are activated if the signal from the door sensor indicates that the door is open.

11. The audio or visual recording or mixing device recited in claim 10 further comprising a door sensor, wherein said LED lights are activated if the signal from the door sensor indicates that the door is open.

12. An audio or visual recording or mixing device comprising:
   a microprocessor;
   a user interface comprising an e-paper display;
   a primary DC power supply that supplies power for the microprocessor and the e-paper display under normal operating conditions;
   a reserve capacitor in parallel with the microprocessor that receives voltage from the primary DC power supply under normal operating conditions and stores a limited amount of electrical power during normal operating conditions; and a power level sensor that senses the voltage level of the electrical power being supplied to the microprocessor, and the microprocessor is programmed to operate the e-paper display in accordance with the following steps:
   a. providing a home screen that is displayed on the e-paper display, said home screen including a power status icon that provides an active state in which current information regarding power status is displayed when the e-paper display is refreshed;
   b. repeatedly checking the status of the signal from the power level sensor;
   c. refreshing or maintaining the home screen on the e-paper display with the power status icon in its active state if the signal from the power level sensor indicates that the power level is at or above a set operating threshold value;
   d. refreshing the home screen on the e-paper display, using power stored in the reserve capacitor, to remove the power status icon or indicate that the power status icon is not active and may not be displaying current information regarding power status if the signal from the power level sensor indicates that the power level is below the set operating threshold value;
   such that the home screen does not display the power status icon in an active state when the power level is below the set operating threshold value.

13. The audio or visual recording or mixing device recited in claim 12 further comprising LED lights that provide supplemental lighting for the e-paper display.

* * * * *